United States Patent
Hara

(10) Patent No.: US 10,515,540 B2
(45) Date of Patent: Dec. 24, 2019

(54) ROBOT

(71) Applicant: Seiko Epson Corporation, Tokyo (JP)

(72) Inventor: Tatsuya Hara, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/850,606

(22) Filed: Dec. 21, 2017

(65) Prior Publication Data

US 2018/0182237 A1   Jun. 28, 2018

(30) Foreign Application Priority Data

Dec. 27, 2016  (JP) .................. 2016-252460

(51) Int. Cl.
| | |
|---|---|
| G08C 23/06 | (2006.01) |
| B25J 9/04 | (2006.01) |
| B25J 13/00 | (2006.01) |
| H04B 10/80 | (2013.01) |
| B25J 19/00 | (2006.01) |
| H04B 10/25 | (2013.01) |
| G01D 5/26 | (2006.01) |

(52) U.S. Cl.
CPC .............. *G08C 23/06* (2013.01); *B25J 9/046* (2013.01); *B25J 13/00* (2013.01); *B25J 19/0025* (2013.01); *H04B 10/25* (2013.01); *H04B 10/807* (2013.01); *G01D 5/26* (2013.01); *Y10S 901/15* (2013.01); *Y10S 901/23* (2013.01); *Y10S 901/31* (2013.01)

(58) Field of Classification Search
CPC ...... G08C 23/06; H04B 10/25; H04B 10/807; B25J 19/0025; B25J 13/00; B25J 9/046; Y10S 901/31; Y10S 901/23; Y10S 901/15; G01D 5/26
See application file for complete search history.

(56) References Cited

U.S. PATENT DOCUMENTS

| | | | |
|---|---|---|---|
| 6,678,477 B1* | 1/2004 | Matsuda | H04B 10/11 398/135 |
| 8,180,225 B2* | 5/2012 | Werthen | H04B 10/807 398/135 |
| 2016/0091117 A1* | 3/2016 | Boccoleri | F16M 11/10 348/804 |

FOREIGN PATENT DOCUMENTS

JP            63-288693 A       11/1988

\* cited by examiner

*Primary Examiner* — Leslie C Pascal
(74) *Attorney, Agent, or Firm* — Harness, Dickey & Pierce, P.L.C.

(57) ABSTRACT

A robot has a first member, an optical wire placed in the first member, a power line placed in the first member, a photoelectric conversion unit placed in the first member, and an encoder placed in the first member, wherein the optical wire is connected to be optically communicable with the photoelectric conversion unit, the power line is connected to be conductive to the encoder and the photoelectric conversion unit, and a current flowing in the power line is distributed to the encoder and the photoelectric conversion unit.

3 Claims, 9 Drawing Sheets

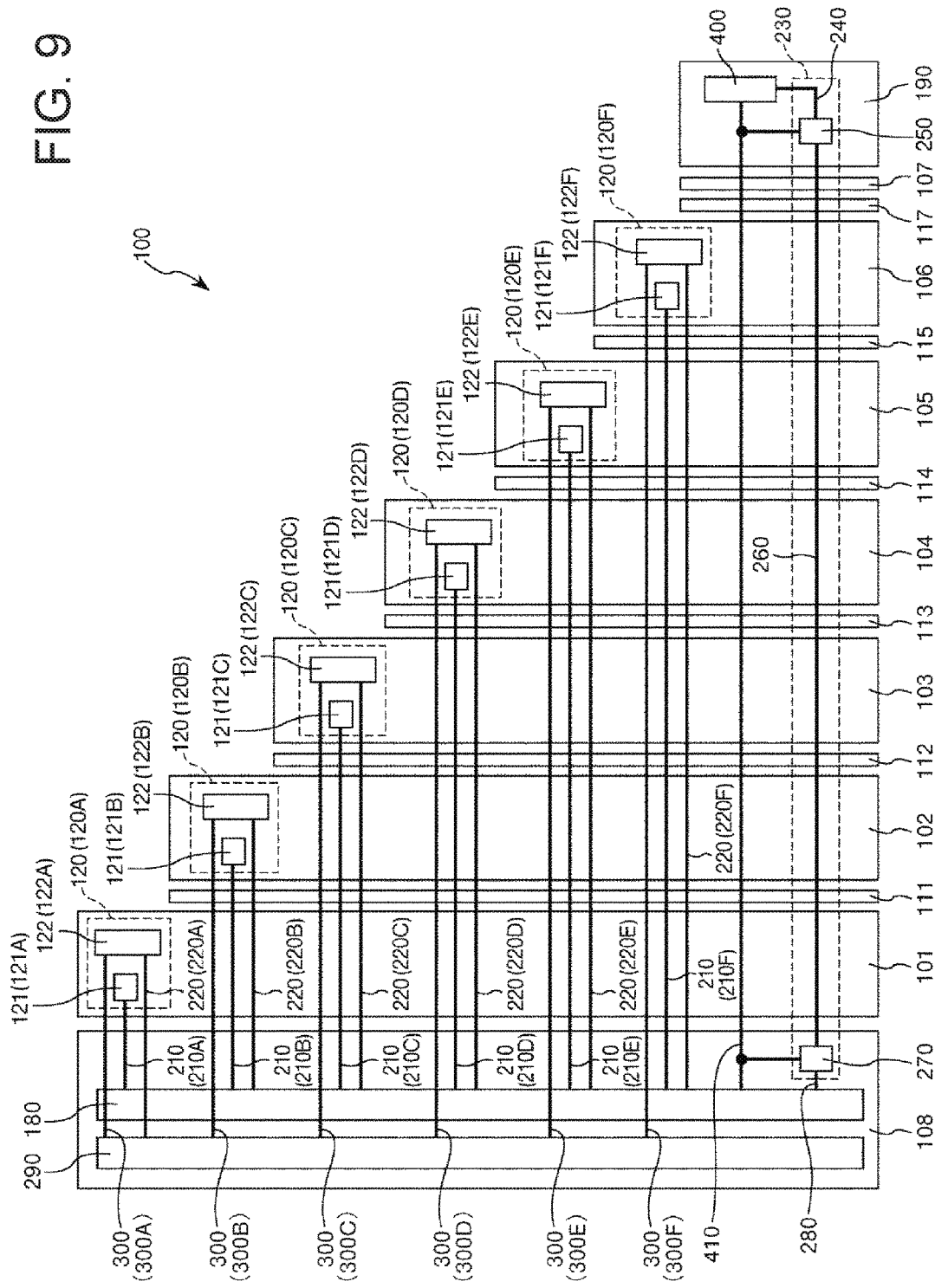

ROBOT

BACKGROUND

1. Technical Field

The present invention relates to a robot.

2. Related Art

Patent Document 1 (JP-A-63-288693) discloses a robot that transmits and receives signals using an optical transceiver (photon-to-current conversion unit, current-to-photon conversion unit) that can switch between an electrical signal and a light signal.

However, the optical transceiver requires a power source and, for example, when a power source line for optical transceiver is mounted, upsizing of the robot is caused. That is, in the robot of Patent Document 1, downsizing is difficult.

SUMMARY

An advantage of some aspects of the invention is to provide a robot that can make optical communications while upsizing is suppressed.

The invention can be implemented as the following configurations.

A robot according to an aspect of the invention includes a first member, an optical wire placed in the first member, a power line placed in the first member, a photoelectric conversion unit placed in the first member, and an encoder placed in the first member, wherein the optical wire is connected to be optically communicable with the photoelectric conversion unit, the power line is connected to be conductive to the encoder and the photoelectric conversion unit, and a current flowing in the power line is distributed to the encoder and the photoelectric conversion unit.

With this configuration, a power supply wire used exclusively for the photoelectric conversion unit is unnecessary and upsizing of the robot may be suppressed.

In the robot according to the aspect of the invention, it is preferable that the power line is branched inside of the first member and connected to the encoder and the photoelectric conversion unit.

With this configuration, the wiring length of the power line from the branched portion to the photoelectric conversion unit may be made shorter (that is, the placement space of the power line within the first member may be made smaller) and upsizing of the robot 100 may be suppressed.

In the robot according to the aspect of the invention, it is preferable that an electrical signal output from the encoder is converted into a light signal by the photoelectric conversion unit and propagated by the optical wire.

With this configuration, a detection signal of the encoder may be transmitted faster. Further, the light signal is hard to be affected by surrounding electrical wires or the like, and noise is hard to be superimposed on the detection signal.

A robot according to an aspect of the invention includes a first member, an optical wire placed in the first member, a power line placed in the first member, a photoelectric conversion unit placed in the first member, and a motor placed in the first member, wherein the optical wire is connected to be optically communicable with the photoelectric conversion unit, the power line is connected to be conductive to the motor and the photoelectric conversion unit, and a current flowing in the power line is distributed to the motor and the photoelectric conversion unit.

With this configuration, a power supply wire used exclusively for the photoelectric conversion unit is unnecessary and upsizing of the robot may be suppressed.

In the robot according to the aspect of the invention, an encoder placed in the first member is provided and it is preferable that an electrical signal output from the encoder is converted into a light signal by the photoelectric conversion unit and propagated by the optical wire.

With this configuration, a detection signal of the encoder may be transmitted faster. Further, the light signal is hard to be affected by surrounding electrical wires or the like, and noise is hard to be superimposed on the detection signal.

A robot according to an aspect of the invention includes a first member, an optical wire placed in the first member, a power line placed in the first member, a photoelectric conversion unit placed in the first member, and an electronic component placed in the first member, wherein the optical wire is connected to be optically communicable with the photoelectric conversion unit, the power line is connected to be conductive to the electronic component and the photoelectric conversion unit, and a current flowing in the power line is distributed to the electronic component and the photoelectric conversion unit.

With this configuration, a power supply wire used exclusively for the photoelectric conversion unit is unnecessary and upsizing of the robot may be suppressed.

In the robot according to the aspect of the invention, a second member and a rotary connecting part that rotatably couples the first member to the second member are provided, and it is preferable that the optical wire and the power line are placed inside of the first member and inside of the second member through inside of the rotary connecting part, respectively.

With this configuration, the optical wire and the power line may be protected.

BRIEF DESCRIPTION OF THE DRAWINGS

The invention will be described with reference to the accompanying drawings, wherein like numbers reference like elements.

FIG. 9 is a block diagram showing an electrical and optical configuration of a robot according to a sixth embodiment of the invention.

DESCRIPTION OF EXEMPLARY EMBODIMENTS

As below, a robot according to the invention will be explained in detail based on embodiments shown in the accompanying drawings.

First Embodiment

First, a robot according to the first embodiment of the invention will be explained.

Figure 1:
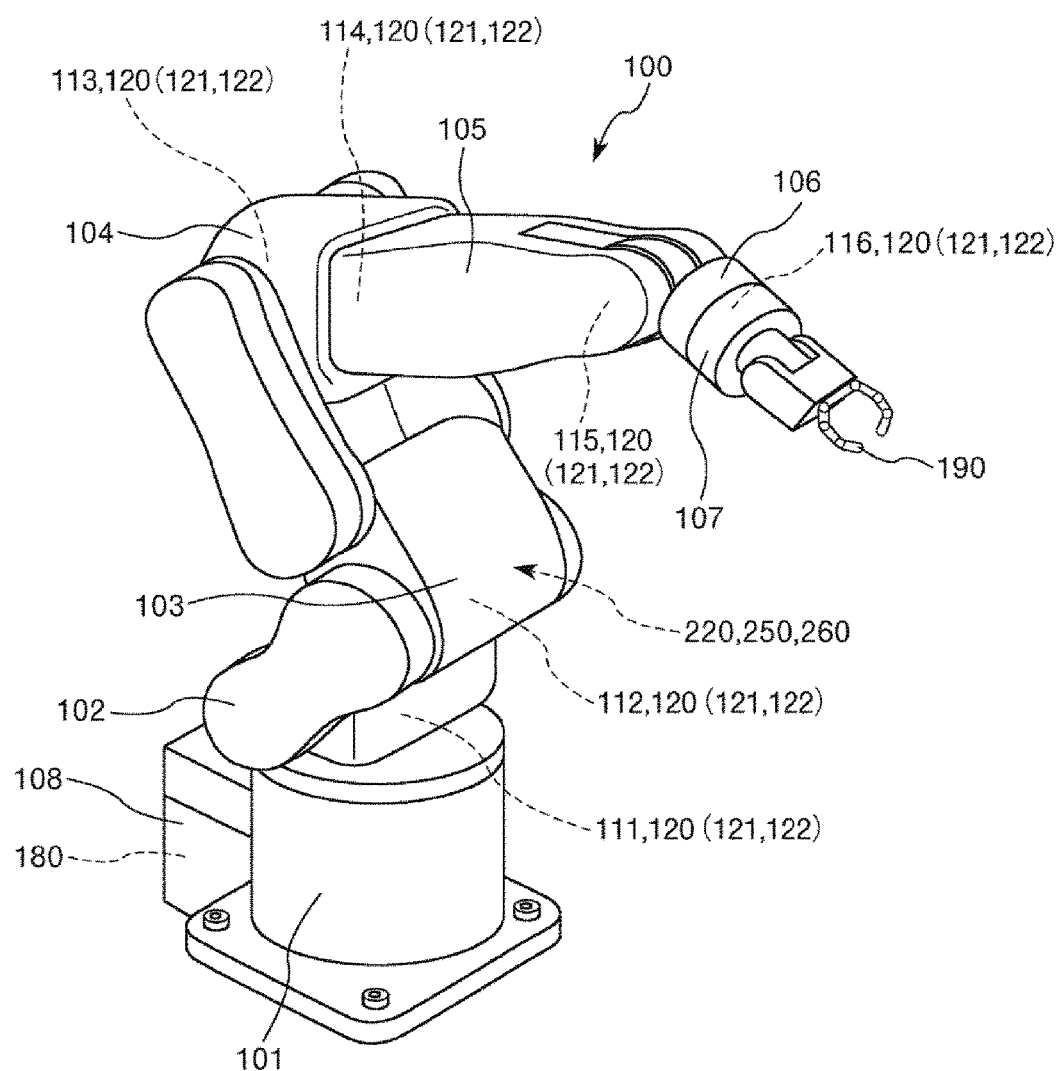
FIG. 1 is a perspective view showing a robot according to a first embodiment of the invention.
Figure 2:
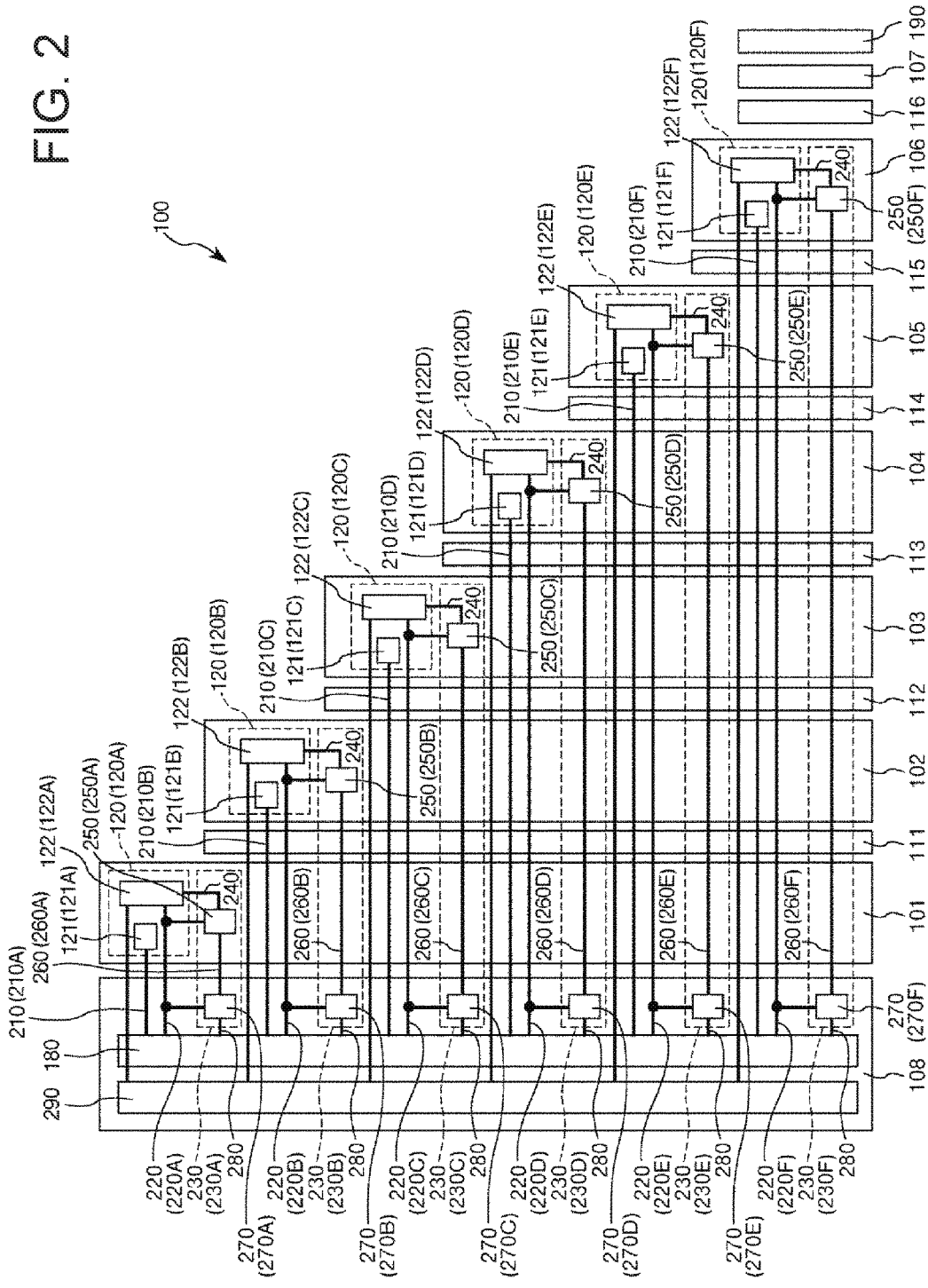
FIG. 2 is a block diagram showing an electrical and optical configuration of the robot shown in FIG. 1.
Figure 3:
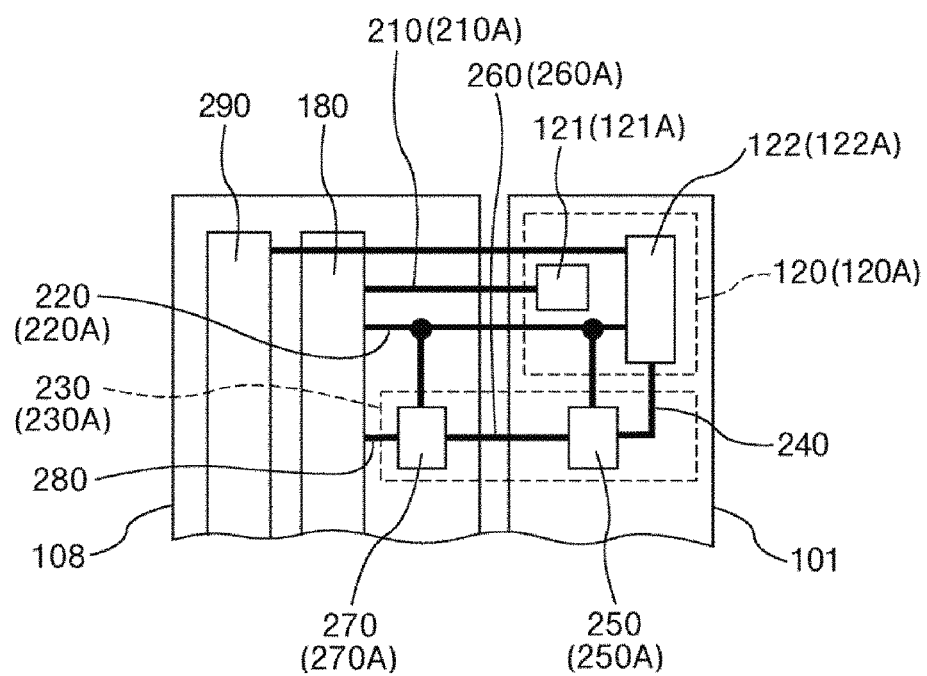
FIG. 3 is a block diagram in which apart of the block diagram shown in FIG. 2 is enlarged.
Figure 4:
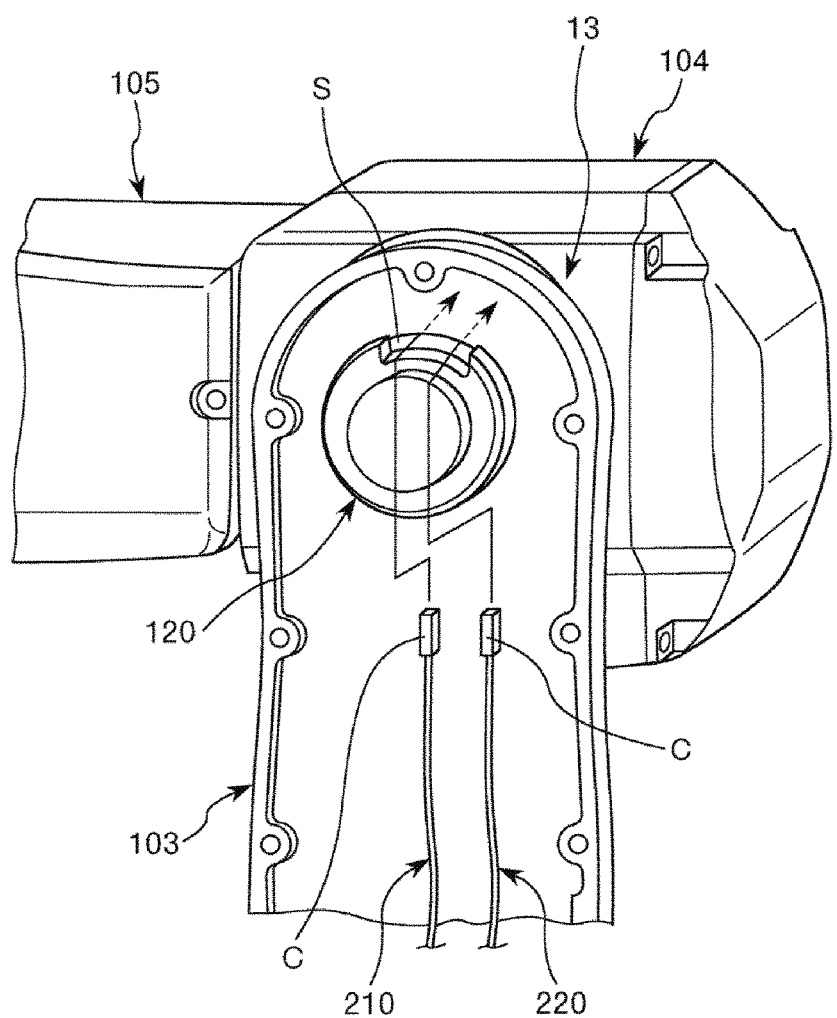
FIG. 4 is a perspective view for explanation of a method of routing wires of the robot shown in FIG. 1.

FIG. 1 is a perspective view showing the robot according to the first embodiment of the invention. FIG. 2 is a block diagram showing an electrical and optical configuration of the robot shown in FIG. 1. FIG. 3 is a block diagram in which a part of the block diagram shown in FIG. 2 is enlarged. FIG. 4 is a perspective view for explanation of a method of routing wires of the robot shown in FIG. 1.

A robot 100 shown in FIG. 1 may perform work including supply, removing, carrying, and assembly of precision apparatuses and components (objects) forming the apparatuses.

The robot 100 is a six-axis robot (multi-joint robot), and has a base 101 to be fixed to a floor, ceiling, or the like, an arm 102 rotatably coupled to the base 101 via a joint part 111 as a rotary connecting part, an arm 103 rotatably coupled to the arm 102 via a joint part 112 as a rotary connecting part, an arm 104 rotatably coupled to the arm 103 via a joint part 113 as a rotary connecting part, an arm 105 rotatably coupled to the arm 104 via a joint part 114 as a rotary connecting part, an arm 106 rotatably coupled to the arm 105 via a joint part 115 as a rotary connecting part, an arm 107 rotatably coupled to the arm 106 via a joint part 116 as a rotary connecting part, a control box 108 provided on a side part of the base 101, a robot control unit 180 housed within the control box 108 and controlling driving of the respective arms 102, 103, 104, 105, 106, 107. The base 101 and the respective arms 102, 103, 104, 105, 106, 107 respectively have spaces (cavity parts) within (inside), and may house optical wires 260, power supply wires for motor 210, power supply wires for encoder 220, and optical transceivers 250, which will be described later.

Further, a hand connecting portion is provided in the arm 107, and a hand 190 (end effector) according to work to be executed by the robot 100 is attached to the hand connecting portion. Furthermore, drive units 120 are mounted in the respective joint parts 111, 112, 113, 114, 115, 116, and the respective arms 102, 103, 104, 105, 106, 107 rotate by driving of the drive units 120.

The respective drive units 120 have motors 121 and reducers (not shown) for rotation of the corresponding arms and encoders 122 that detect rotation angles of the corresponding arms, and is controlled by a robot control unit 180.

Hereinafter, for convenience of explanation, the drive unit 120 (motor 121, encoder 122) of the joint part 111 is also referred to as "drive unit 120A (motor 121A, encoder 122A)", the drive unit 120 (motor 121, encoder 122) of the joint part 112 is also referred to as "drive unit 120B (motor 121B, encoder 122B)", the drive unit 120 (motor 121, encoder 122) of the joint part 113 is also referred to as "drive unit 120C (motor 121C, encoder 122C)", the drive unit 120 (motor 121, encoder 122) of the joint part 114 is also referred to as "drive unit 120D (motor 121D, encoder 122D)", the drive unit 120 (motor 121, encoder 122) of the joint part 115 is also referred to as "drive unit 120E (motor 121E, encoder 122E)", and the drive unit 120 (motor 121, encoder 122) of the joint part 116 is also referred to as "drive unit 120F (motor 121F, encoder 122F)".

Next, the electrical and optical configuration of the robot 100 will be explained. As shown in FIGS. 2 and 3, the robot control unit 180 and the respective drive units 120 are connected by the optical wires and electrical wires.

As shown in FIG. 2, the robot 100 electrically connects the robot control unit 180 and the motors 121 of the respective drive units 120, and has a plurality (six) of the power supply wires for motor 210 that supply drive power from the robot control unit 180 to the respective motors 121. The drive power is supplied from the robot control unit 180 to the respective motors 121 via the power supply wires for motor 210, and thereby, the respective motors 121 are driven and the respective arms 102, 103, 104, 105, 106, 107 may be moved at predetermined times and predetermined rotation angles.

Note that, hereinafter, for convenience of explanation, the power supply wire for motor 210 that electrically connects the robot control unit 180 and the motor 121A is also referred to as "power supply wire for motor 210A", the power supply wire for motor 210 that electrically connects the robot control unit 180 and the motor 121B is also referred to as "power supply wire for motor 210B", the power supply wire for motor 210 that electrically connects the robot control unit 180 and the motor 121C is also referred to as "power supply wire for motor 210C", the power supply wire for motor 210 that electrically connects the robot control unit 180 and the motor 121D is also referred to as "power supply wire for motor 210D", the power supply wire for motor 210 that electrically connects the robot control unit 180 and the motor 121E is also referred to as "power supply wire for motor 210E", and the power supply wire for motor 210 that electrically connects the robot control unit 180 and the motor 121F is also referred to as "power supply wire for motor 210F".

Further, the robot 100 electrically connects the robot control unit 180 and the encoders 122 of the respective drive units 120, and has a plurality (six) of the power supply wires for encoder 220 that supply drive power from the robot control unit 180 to the respective encoders 122. The drive power is supplied from the robot control unit 180 to the respective encoders 122 via the power supply wires for encoder 220, and thereby, the respective encoders 122 are driven and the rotation angles of the respective arms 102, 103, 104, 105, 106, 107 may be detected.

Note that, hereinafter, for convenience of explanation, the power supply wire for encoder 220 that electrically connects the robot control unit 180 and the encoder 122A is also referred to as "power supply wire for encoder 220A", the power supply wire for encoder 220 that electrically connects the robot control unit 180 and the encoder 122B is also referred to as "power supply wire for encoder 220B", the power supply wire for encoder 220 that electrically connects the robot control unit 180 and the encoder 122C is also referred to as "power supply wire for encoder 220C", the power supply wire for encoder 220 that electrically connects the robot control unit 180 and the encoder 122D is also referred to as "power supply wire for encoder 220D", the power supply wire for encoder 220 that electrically connects the robot control unit 180 and the encoder 122E is also referred to as "power supply wire for encoder 220E", and the power supply wire for encoder 220 that electrically connects the robot control unit 180 and the encoder 122F is also referred to as "power supply wire for encoder 220F".

The power supply wires for motor 210 and the power supply wires for encoder 220 (except the power supply wire for motor 210A and the power supply wire for encoder 220A) are routed into the respective arms through inside of the respective joint parts located between the base 101 and the arms, and substantially have no parts exposed outside of the robot 100.

Specifically, as shown in FIG. 2, the power supply wire for motor 210B and the power supply wire for encoder 220B are routed from the base 101 to the arm 102 through the joint part 111. The power supply wire for motor 210C and the power supply wire for encoder 220C are routed from the base 101 to the arm 103 through the joint parts 111, 112. The power supply wire for motor 210D and the power supply wire for encoder 220D are routed from the base 101 to the arm 104 through the joint parts 111, 112, 113. The power supply wire for motor 210E and the power supply wire for encoder 220E are routed from the base 101 to the arm 105 through the joint parts 111, 112, 113, 114. The power supply wire for motor 210F and the power supply wire for encoder 220F are routed from the base 101 to the arm 106 through the joint parts 111, 112, 113, 114, 115. As described above, the respective power supply wires 210, 220 are routed within the robot 100, and thereby, the respective power supply wires 210, 220 may be protected. Note that the placement of the respective power supply wires 210, 220 is not particularly limited, but, for example, at least part may be routed outside of the robot 100.

Here, the encoders 122 are not particularly limited as long as the encoders may detect the rotation angles of the arms 102, 103, 104, 105, 106, 107. For example, optical encoders having rotary plates having polarizer portions, light emitting elements that output lights toward the rotary plates, and light receiving elements that receive the lights reflected by the rotary plates or lights transmitted through the rotary plates and detecting the rotation angles of the arms based on the intensity of the lights received by the light receiving elements may be used. In this case, for example, the drive power for the light emitting elements and the light receiving elements are supplied from the robot control unit 180 to the encoders 122 via the power supply wires for encoder 220.

Or, as the encoders 122, for example, image-recognition encoders having rotary plates with markers for image recognition, cameras for image recognition of the markers provided on the rotary plates, and image processing parts that process images captured by the cameras and detecting the rotation angles of the arms based on the types and locations of the markers captured by the cameras may be used. In this case, for example, the drive power for the cameras and the image processing parts are supplied from the robot control unit 180 to the encoders 122 via the power supply wires for encoder 220.

The robot 100 connects the robot control unit 180 and the encoders 122 of the respective drive units 120, and has detection signal transmission paths 230 that transmit detection signals (information on the rotation angle of the arms) of the respective encoders 122 to the robot control unit 180. The detection signals of the respective encoders 122 are transmitted to the robot control unit 180 via the detection signal transmission paths 230, and thereby, the robot control unit 180 may feed back the detection signals and control driving of the respective motors 121. Accordingly, the driving of the respective arms 102, 103, 104, 105, 106, 107 may be controlled more accurately.

As shown in FIGS. 2 and 3, the detection signal transmission paths 230 have electrical wires 240 connected to the encoders 122, the optical transceivers 250 (photoelectric conversion units) electrically connected to the encoders 122 via the electrical wires 240 and converting the detection signals (electrical signals) of the encoders 122 into light signals, the optical wires 260 optically connected to the optical transceivers 250 and propagating the light signals converted by the optical transceivers 250, optical transceivers 270 (photoelectric conversion units) connected to the optical transceivers 250 via the optical wires 260 and converting the light signals from the optical transceivers 250 into electrical signals, and electrical wires 280 that electrically connect the optical transceivers 270 and the robot control unit 180 and transmit the electrical signals converted from the light signals by the optical transceivers 270 (the detection signals of the encoders 122) to the robot control unit 180.

According to the detection signal transmission paths 230, the detection signals from the encoders 122 may be transmitted to the robot control unit 180 via optical communications, and thereby, the detection signals may be transmitted faster compared to the case where electrical wires are used for transmission of the detection signals to the robot control unit 180. Accordingly, the transmission times of the detection signals are shortened and the driving of the respective arms 102, 103, 104, 105, 106, 107 may be controlled more accurately by the robot control unit 180. Further, larger volumes of data may be transmitted. The light signals are hard to be affected by the surrounding electrical wires and, according to the detection signal transmission paths 230, noise from the surrounding electrical wires is hard to be superimposed on the detection signals. Accordingly, the detection signals with less noise and higher S/N ratios may be transmitted to the robot control unit 180, and the robot control unit 180 may control the driving of the respective arms 102, 103, 104, 105, 106, 107 more accurately.

Note that, hereinafter, for convenience of explanation, the detection signal transmission path 230 (optical transceivers 250, 270, optical wire 260) connected to the encoder 122A is also referred to as "detection signal transmission paths 230A (optical transceivers 250A, 270A, optical wire 260A)", the detection signal transmission path 230 (optical transceivers 250, 270, optical wire 260) connected to the encoder 122B is also referred to as "detection signal transmission paths 230B (optical transceivers 250B, 270B, optical wire 260B)", the detection signal transmission path 230 (optical transceivers 250, 270, optical wire 260) connected to the encoder 122C is also referred to as "detection signal transmission paths 230C (optical transceivers 250C, 270C, optical wire 260C)", the detection signal transmission path 230 (optical transceivers 250, 270, optical wire 260) connected to the encoder 122D is also referred to as "detection signal transmission paths 230D (optical transceivers 250D, 270D, optical wire 260D)", the detection signal transmission path 230 (optical transceivers 250, 270, optical wire 260) connected to the encoder 122E is also referred to as "detection signal transmission paths 230E (optical transceivers 250E, 270E, optical wire 260E)", and the detection signal transmission path 230 (optical transceivers 250, 270, optical wire 260) connected to the encoder 122F is also referred to as "detection signal transmission paths 230F (optical transceivers 250F, 270F, optical wire 260F)".

The respective optical transceivers 270 are provided within the control box 108. Thereby, the optical transceivers 270 are placed close to the robot control unit 180, and the electrical wires 280 may be shortened. In other words, occupancy of the optical wires 260 in the detection signal transmission paths 230 may be made higher. Accordingly, the light signals are harder to be affected by the surrounding electrical wires and the noise is harder to be superimposed on the detection signals.

Note that the placement of the respective optical transceivers 270 is not particularly limited, but the optical transceivers may be placed in another part (e.g. within the base 101) than the control box 108. Or, for example, the robot control unit 180 may have the respective optical transceivers 270. That is, the detection signal transmission paths 230 may have the electrical wires 240, the optical transceivers 250, and the optical wires 260, and the optical wires 260 may be connected to the optical transceivers 270 provided in the robot control unit 180.

The configuration of the above described optical transceiver 270 is not particularly limited as long as the optical transceiver may convert the light signal into the electrical signal. For example, the optical transceiver 270 may have an optical sub-assembly connected to the optical wire 260 and receiving the light signal (ROSA: Receiving Optical Sub-Assembly), a control part that executes electrical signal processing and control for the optical sub-assembly, and a connecting portion connected to the electrical wire 280.

On the other hand, the respective optical transceivers 250 are provided within the arms located on the proximal end sides (root sides, base 101 sides) of the joint parts in which the corresponding encoders 122 are placed.

Specifically, as shown in FIG. 2, the optical transceiver 250A connected to the encoder 122A is placed within the base 101, the optical transceiver 250B connected to the encoder 122B is placed within the arm 102, the optical transceiver 250C connected to the encoder 122C is placed within the arm 103, the optical transceiver 250D connected to the encoder 122D is placed within the arm 104, the optical transceiver 250E connected to the encoder 122E is placed within the arm 105, and the optical transceiver 250F connected to the encoder 122F is placed within the arm 106. Thereby, the respective optical transceivers 250 may be placed close to the corresponding encoders 122, and the electrical wires 240 may be shortened. In other words, the occupancy of the optical wires 260 in the detection signal transmission paths 230 may be made higher. Accordingly, the light signals are harder to be affected by the surrounding electrical wires and the noise is harder to be superimposed on the detection signals.

Note that the placement of the optical transceivers 250 is particularly effective when the encoders 122 are placed in the arms on the proximal end sides with respect to the corresponding joint parts (for example, the encoder 122D is placed in the arm 104 and the encoder 122E is placed in the arm 105). That is, it is preferable that the respective optical transceivers 250 are placed within the same arms as the arms in which the corresponding encoders 122 (more specifically, the connecting portions to the electrical wires 240) are placed. Thereby, the respective optical transceivers 250 may be placed closer to the corresponding encoders 122 and the electrical wires 240 may be made shorter.

Note that the placement of the respective optical transceivers 250 is not particularly limited, but may be appropriately set according to the placement of the corresponding encoders 122. For example, in contrast to the above described configuration, when the encoders 122 are placed in the arms on the distal end sides with respect to the corresponding joint parts (for example, the encoder 122D is placed in the arm 105 and the encoder 122E is placed in the arm 106), the optical transceivers 250 may be placed within the arms located on the distal end sides of the joint parts in which the corresponding encoders 122 are placed (for example, the optical transceiver 250D is placed within the arm 105 and the optical transceiver 250E is placed within the arm 106). According to the placement, the respective optical transceivers 250 may be placed closer to the corresponding encoders 122 and the electrical wires 240 may be made shorter. Therefore, the light signals are harder to be affected by the surrounding electrical wires and the noise is harder to be superimposed on the detection signals.

Or, the optical transceivers 250 placed within the arms located on the distal end sides of the joint parts in which the corresponding encoders 122 are placed and the optical transceivers 250 placed within the arms located on the proximal end sides may be mixed. Or, the optical transceivers 250 may be provided in other locations.

The configuration of the optical transceiver 250 is not particularly limited as long as the optical transceiver may convert the electrical signal into the light signal. For example, the optical transceiver 250 may have an optical sub-assembly connected to the optical wire 260 and transmitting the light signal (TOSA: Transmitting Optical Sub-Assembly), a control part that executes electrical signal processing and control for the optical sub-assembly, and a connecting portion connected to the electrical wire 240.

The optical wires 260 are routed into the arms through inside of the joint parts and substantially have no parts exposed outside of the robot 100.

Specifically, as shown in FIG. 2, the optical wire 260B is routed from the base 101 to the arm 102 through the joint part 111. The optical wire 260C is routed from the base 101 to the arm 103 through the joint parts 111, 112. The optical wire 260D is routed from the base 101 to the arm 104 through the joint parts 111, 112, 113. The optical wire 260E is routed from the base 101 to the arm 105 through the joint parts 111, 112, 113, 114. The optical wire 260F is routed from the base 101 to the arm 106 through the joint parts 111, 112, 113, 114, 115. As described above, the optical wires 260 are routed within the robot 100, and thereby, the optical wires 260 may be protected. Note that the placement of the optical wires 260 is not particularly limited, but, for example, at least part may be routed outside of the robot 100.

Here, the optical wires 260 are not particularly limited as long as the optical wires may propagate the light signals. For example, optical fibers may be used. The optical fibers are used as the optical wires 260, thereby, contributes to reduction in diameter of the optical wires 260, and the robot 100 may be downsized.

As above, the configuration of the detection signal transmission paths 230 is explained. Here, electric power is required for driving of the respective optical transceivers 250, 270. Accordingly, for example, a plurality of power supply wires electrically connecting the robot control unit 180 and the respective optical transceivers 250 and supplying drive power from the robot control unit 180 to the respective optical transceivers 250 and a plurality of power supply wires electrically connecting the robot control unit 180 and the respective optical transceivers 270 and supplying drive power from the robot control unit 180 to the respective optical transceivers 270 are required. However, spaces for routing of those power supply wires within the robot 100 are required and upsizing of the respective arms 102, 103, 104, 105, 106, 107 and the respective joint parts 111, 112, 113, 114, 115, 116, i.e., upsizing of the robot 100 is caused.

Accordingly, in the embodiment, as shown in FIGS. 2 and 3 (particularly, FIG. 3), the power supply wires for encoder 220 are branched at some midpoints and connected to the optical transceivers 250, 270 so that the electric power may be supplied (distributed) to the optical transceivers 250, 270 via the power supply wires for encoder 220. That is, the currents flowing in the power supply wires for encoder 220 are distributed to the optical transceivers 250, 270. Thereby, compared to the configuration described in the previous paragraph, the number of wires may be reduced and upsizing of the robot 100 may be suppressed.

Specifically, as shown in FIGS. 2 and 3, the optical transceiver 270A is electrically connected to the power supply wire for encoder 220A and supplied with drive power from the robot control unit 180 via the power supply wire for encoder 220A (particularly, see FIG. 3). The optical transceiver 270B is electrically connected to the power supply wire for encoder 220B and supplied with drive power from the robot control unit 180 via the power supply wire for encoder 220B. The optical transceiver 270C is electrically connected to the power supply wire for encoder 220C and supplied with drive power from the robot control unit 180 via the power supply wire for encoder 220C. The optical transceiver 270D is electrically connected to the power supply wire for encoder 220D and supplied with drive power from the robot control unit 180 via the power supply wire for encoder 220D. The optical transceiver 270E is electrically connected to the power supply wire for encoder 220E and supplied with drive power from the robot control unit 180 via the power supply wire for encoder 220E. The optical transceiver 270F is electrically connected to the power supply wire for encoder 220F and supplied with drive power from the robot control unit 180 via the power supply wire for encoder 220F.

According to the configuration, as described above, the power supply wires used exclusively for the optical transceivers 270 are unnecessary and upsizing of the robot 100 may be suppressed. Particularly, the respective power supply wires for encoder 220 are branched within the control box 108 in which the respective optical transceivers 270 are placed, and thereby, the wiring lengths from the branched portions to the optical transceivers 270 may be made shorter. Accordingly, the above described advantages are more remarkable.

Note that, as described above, the respective optical transceivers 270 are electrically connected to the corresponding power supply wires for encoder 220 so that the optical transceiver 270A may be electrically connected to the power supply wire for encoder 220A and the optical transceiver 270B may be electrically connected to the power supply wire for encoder 220B, however, not limited to that. That is, for example, the respective optical transceivers 270 may be electrically connected to the non-corresponding power supply wires for encoder 220 so that the optical transceiver 270B may be electrically connected to the power supply wire for encoder 220C. According to the configuration, the same advantages as those of the embodiment may be offered.

Further, the optical transceiver 250A is electrically connected to the power supply wire for encoder 220A and supplied with drive power from the robot control unit 180 via the power supply wire for encoder 220A. The optical transceiver 250B is electrically connected to the power supply wire for encoder 220B and supplied with drive power from the robot control unit 180 via the power supply wire for encoder 220B. The optical transceiver 250C is electrically connected to the power supply wire for encoder 220C and supplied with drive power from the robot control unit 180 via the power supply wire for encoder 220C. The optical transceiver 250D is electrically connected to the power supply wire for encoder 220D and supplied with drive power from the robot control unit 180 via the power supply wire for encoder 220D. The optical transceiver 250E is electrically connected to the power supply wire for encoder 220E and supplied with drive power from the robot control unit 180 via the power supply wire for encoder 220E. The optical transceiver 250F is electrically connected to the power supply wire for encoder 220F and supplied with drive power from the robot control unit 180 via the power supply wire for encoder 220F.

According to the configuration, as described above, the power supply wires used exclusively for the optical transceivers 250 are unnecessary and upsizing of the robot 100 may be suppressed. Particularly, the respective power supply wires for encoder 220 are branched within the arms in which the corresponding optical transceivers 250 are placed (for example, the power supply wire for encoder 220D is branched within the arm 104 and the power supply wire for encoder 220E is branched within the arm 105), and thereby, the wiring lengths from the branched portions to the optical transceivers 250 may be made shorter. Accordingly, the above described advantages are more remarkable.

Note that, as described above, the respective optical transceivers 250 are electrically connected to the corresponding power supply wires for encoder 220, however, not limited to that. The respective optical transceivers may be electrically connected to the non-corresponding power supply wires for encoder 220. According to the configuration, the same advantages as those of the embodiment may be offered.

As shown in FIGS. 2 and 3, the robot 100 has a battery 290. The battery 290 is a power source for emergency in a power failure or the like and placed in the control box 108, for example. The battery 290 is electrically connected to the respective encoders 122 and used as a power source for storing the rotation angles of the respective arms sensed by the respective encoders 122 (position information of the respective arms immediately before stopping) in a power failure until restart. Note that the use of the battery 290 is not limited to that. For example, the battery may be used as a power source electrically connected to the respective motors 121 for driving the respective motors 121 to rotate the respective arms to the initial positions (predetermined positions) in a power failure. Or, the battery 290 may be omitted.

As above, the robot 100 is explained in detail. When at least one of the base 101 and the arms 102, 103, 104, 105, 106 is "first member" according to the invention, as shown in FIG. 3, the robot 100 has the first member, the optical wire 260 placed in the first member (inside of the first member), the power supply wire for encoder 220 as a power line placed in the first member (inside of the first member), the optical transceiver 250 as a photoelectric conversion unit placed in the first member (inside of the first member), and the encoder 122 placed in the first member (inside of the first member). Further, the optical wire 260 is connected to be optically communicable with the optical transceiver 250, the power supply wire for encoder 220 is connected to be conductive to the encoder 122 and the optical transceiver 250, and the current flowing in the power supply wire for encoder 220 is distributed to the encoder 122 and the optical transceiver 250. According to the configuration, the power supply wire used exclusively for the optical transceiver 250 is unnecessary and upsizing of the robot 100 may be suppressed. The communication speed via optical communications may be made higher and the noise of the detection signals may be made lower, and the robot 100 having the better operating characteristics may be obtained.

Further, as described above, in the robot 100, the power supply wire for encoder 220 is branched inside of the first member and connected to the encoder 122 and the optical transceiver 250 within the first member. Accordingly, the wiring length of the power supply wire for encoder 220 from the branched portion to the optical transceiver 250 may be made shorter (that is, the placement space of the power supply wire for encoder 220 within the first member may be made smaller) and upsizing of the robot 100 may be suppressed.

Particularly, according to the configuration, the number of wires passing through the joint part may be reduced and the joint part may be downsized. If the joint part is not downsized, a space for routing other wires may be secured in the joint part. Specifically, for example, as shown in FIG. 4, the power supply wire for motor 210 and the power supply wire for encoder 220 with connectors C for connection to the motor 121 and the encoder 122 are passed through a gap S provided in the joint part 113 and routed to the arm 103 and the arm 104. Accordingly, a space for the connectors C to pass through is required in the joint part 113, and the required space through the joint 113 is larger because the connectors C are larger and harder relative to the wire main bodies. Therefore, as described above, the space for routing the other wires may be secured in the joint part, and thereby, routing of the power supply wire for motor 210 and the power supply wire for encoder 220 is easier.

As described above, in the robot 100, the electrical signals (detection signals) output from the encoders 122 are converted into the light signals by the optical transceivers 250 and propagated by the optical wires 260. Thereby, the detection signals of the encoders 122 may be transmitted faster. Further, the light signals are hard to be affected by the surrounding electrical wires or the like and noise is hard to be superimposed on the detection signals. Accordingly, the rotation of the respective arms 102, 103, 104, 105, 106, 107 may be controlled more accurately.

When two of the base 101 and the arms 102, 103, 104, 105, 106 coupled via a predetermined joint part (one of the joint parts 111, 112, 113, 114, 115, 116) are respectively "first member" and "second member" and the second member is on the proximal end side (base 101 side) of the first member, the robot 100 has the second member and the rotary connecting part rotatably coupling the first member to the second member, the optical wire 260 and the power supply wire for encoder 220 are placed inside of the first member and inside of the second member through inside of the rotary connecting part, respectively. As an example, the robot 100 has the arm 103 as the second member, the arm 104 as the first member, and the joint part 113 as the rotary connecting part rotatably coupling the arm 104 to the arm 103, and the optical wire 260C and the power supply wire for encoder 220C are placed inside of the arm 103 and inside of the arm 104 through inside of the joint part 113, respectively. As described above, the optical wire 260C and the power supply wire for encoder 220C are placed inside of the robot 100, and thereby, the optical wire 260C and the power supply wire for encoder 220C may be protected.

As above, the robot 100 of the first embodiment is explained. Note that, in the robot 100 of the first embodiment, the optical transceivers 250 are provided in all of the drive units 120, however, the optical transceiver 250 may be provided in at least one drive unit 120. That is, in the embodiment, all of the drive units 120 transmit the detection signals of the encoders 122 to the robot control unit 180 via optical communications, however, the configuration is not limited to that. It is only necessary that at least one drive unit 120 transmits the detection signal of the encoder 122 to the robot control unit 180 via optical communications.

In the embodiment, the power supply wires for encoder 220 are branched at some midpoints and connected to the optical transceivers 250, 270, however, the wires are not limited to that as long as the electric power may be supplied to the optical transceivers 250, 270 via the power supply wires for encoder 220. For example, the optical transceivers 250, 270 may be connected to some midpoints of the power supply wires for encoder 220.

Second Embodiment

Next, a robot according to the second embodiment of the invention will be explained.

Figure 5:
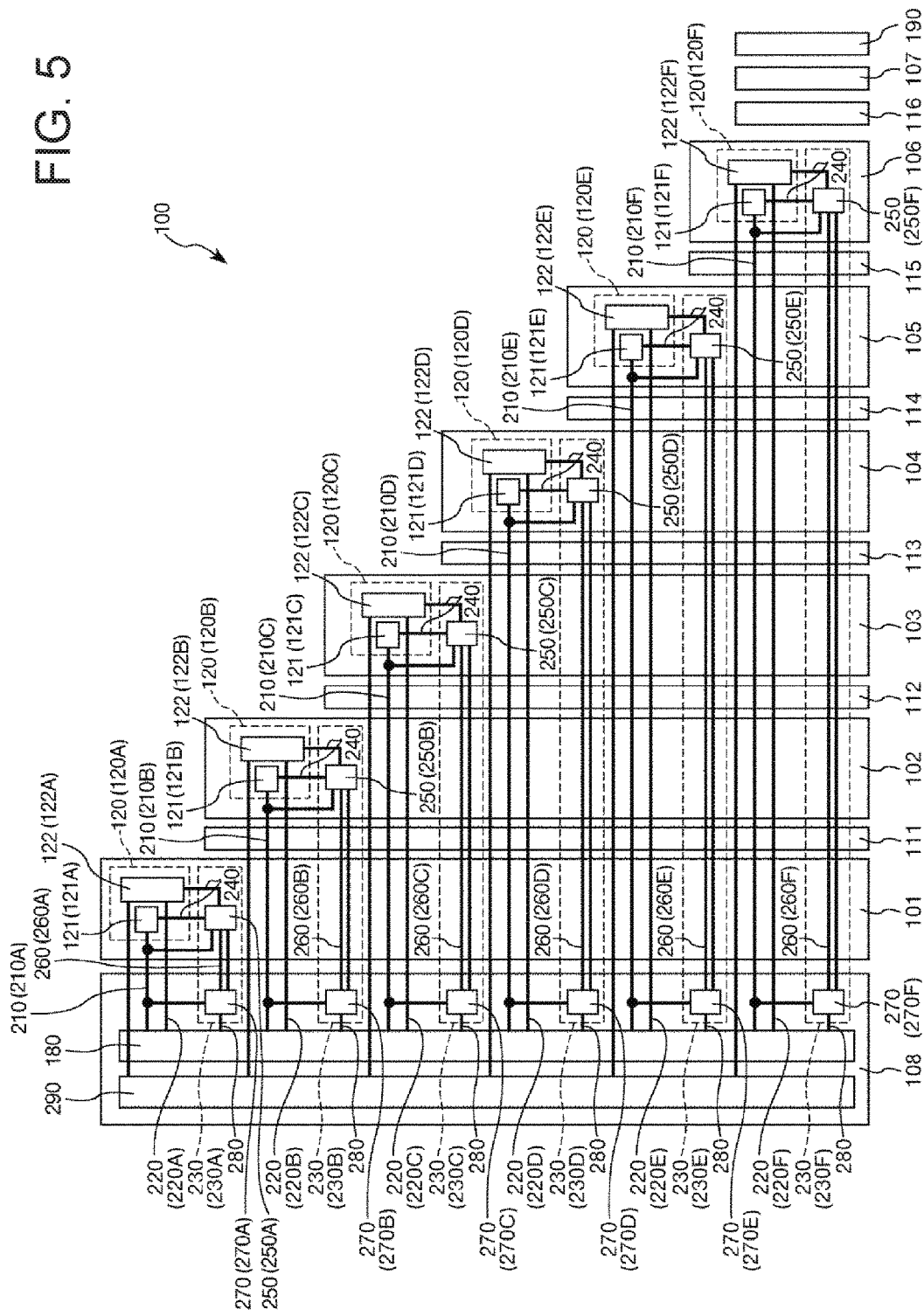
FIG. 5 is a block diagram showing an electrical and optical configuration of a robot according to a second embodiment of the invention.

FIG. 5 is a block diagram showing an electrical and optical configuration of the robot according to the second embodiment of the invention.

The embodiment is the same as the above described first embodiment except that the electrical and optical configuration (wiring structure) is different.

In the following explanation, the embodiment will be explained with a focus on the differences from the above described first embodiment and the explanation of the same items will be omitted. Further, in FIG. 5, the same configurations as those of the above described embodiment have the same signs.

As shown in FIG. 5, in the embodiment, the power supply wires for motor 210 are branched at some midpoints and connected to the optical transceivers 250, 270 so that the electric power may be supplied to the optical transceivers 250, 270 via the power supply wires for motor 210. That is, the currents flowing in power supply wires for motor 210 are distributed to the optical transceivers 250, 270. Thereby, as is the case of the above described first embodiment, the number of wires may be reduced and upsizing of the robot 100 may be suppressed.

Specifically, the optical transceiver 270A is electrically connected to the power supply wire for motor 210A and supplied with drive power from the robot control unit 180 via the power supply wire for motor 210A. The optical transceiver 270B is electrically connected to the power supply wire for motor 210B and supplied with drive power from the robot control unit 180 via the power supply wire for motor 210B. The optical transceiver 270C is electrically connected to the power supply wire for motor 210C and supplied with drive power from the robot control unit 180 via the power supply wire for motor 210C. The optical transceiver 270D is electrically connected to the power supply wire for motor 210D and supplied with drive power from the robot control unit 180 via the power supply wire for motor 210D. The optical transceiver 270E is electrically connected to the power supply wire for motor 210E and supplied with drive power from the robot control unit 180 via the power supply wire for motor 210E. The optical transceiver 270F is electrically connected to the power supply wire for motor 210F and supplied with drive power from the robot control unit 180 via the power supply wire for motor 210F.

According to the configuration, the power supply wires used exclusively for the optical transceivers 270 are unnecessary and upsizing of the robot 100 may be suppressed. Particularly, the respective power supply wires for motor 210 are branched within the control box 108 in which the respective optical transceivers 270 are placed, and thereby, the wiring lengths from the branched portions to the optical transceivers 270 may be made shorter. Accordingly, the above described advantages are more remarkable.

Further, the optical transceiver 250A is electrically connected to the power supply wire for motor 210A and supplied with drive power from the robot control unit 180 via the power supply wire for motor 210A. The optical transceiver 250B is electrically connected to the power supply wire for motor 210B and supplied with drive power from the robot control unit 180 via the power supply wire for motor 210B. The optical transceiver 250C is electrically connected to the power supply wire for motor 210C and supplied with drive power from the robot control unit 180 via the power supply wire for motor 210C. The optical transceiver 250D is electrically connected to the power supply wire for motor 210D and supplied with drive power from the robot control unit 180 via the power supply wire for motor 210D. The optical transceiver 250E is electrically connected to the power supply wire for motor 210E and supplied with drive power from the robot control unit 180 via the power supply wire for motor 210E. The optical transceiver 250F is electrically connected to the power supply wire for motor 210F and supplied with drive power from the robot control unit 180 via the power supply wire for motor 210F.

According to the configuration, the power supply wires used exclusively for the optical transceivers 250 are unnecessary and upsizing of the robot 100 may be suppressed. Particularly, the respective power supply wires for motor 210 are branched within the arms in which the corresponding optical transceivers 250 are placed (for example, the power supply wire for motor 210D is branched within the arm 104 and the power supply wire for motor 210E is branched within the arm 105), and thereby, the wiring lengths from the branched portions to the optical transceivers 250 may be made shorter. Accordingly, the above described advantages are more remarkable.

Here, in the embodiment, the motors 121 include motor drivers (not shown) that control the driving thereof, and the power supply wires for motor 210 are connected to the motor drivers. Accordingly, the driving of the motors 121 can be controlled by constant and continuous supply of electric power to the optical transceivers 250, 270 via the power supply wires for motor 210, for example.

Further, in the embodiment, the optical transceivers 250, 270 have the function of converting electrical signals into light signals and the function of converting light signals into electrical signals, respectively. Thereby, the detection signal transmission paths 230 can perform interactive communications. The optical transceivers 250 are connected to the encoders 122 and the motors 121 (motor drivers) via the electrical wires 240. Two of the optical wires 260 are provided for interactive communications, and control signals of the motors 121 are transmitted from the robot control unit 180 to the motor drivers via one optical wire 260 and the detection signals of the encoders 122 are transmitted from the encoders 122 to the robot control unit 180 via the other optical wire 260.

Note that the configurations of the optical transceivers 250, 270 are not particularly limited, but may have e.g. an optical sub-assembly receiving the light signal (ROSA: Receiving Optical Sub-Assembly), an optical sub-assembly transmitting the light signal (TOSA: Transmitting Optical Sub-Assembly), a control part that executes electrical signal processing and control for these optical sub-assemblies, and connecting portions connected to the electrical wires.

As above, the robot 100 of the embodiment is explained in detail. When at least one of the base 101 and the arms 102, 103, 104, 105, 106 is "first member" according to the invention, the robot 100 has the first member, the optical wire 260 placed in the first member (inside of the first member), the power supply wire for motor 210 as a power line placed in the first member (inside of the first member), the optical transceiver 250 as a photoelectric conversion unit placed in the first member (inside of the first member), and the motor 121 placed in the first member (inside of the first member). Further, the optical wire 260 is connected to be optically communicable with the optical transceiver 250, the power supply wire for motor 210 is connected to be conductive to the motor 121 and the optical transceiver 250, and the current flowing in the power supply wire for motor 210 is distributed to the motor 121 and the optical transceiver 250. According to the configuration, the power supply wire used exclusively for the optical transceiver 250 is unnecessary and upsizing of the robot 100 may be suppressed. The communication speed via optical communications may be made higher and the noise of the detection signals may be made lower, and the robot 100 having the better operating characteristics may be obtained.

Further, as described above, in the robot 100, the encoder 122 placed in the first member is provided, and the electrical signal (detection signal) output from the encoder 122 is converted into the light signal by the optical transceiver 250 and propagated by the optical wire 260. Thereby, the detection signals of the encoder 122 may be transmitted faster. Further, the light signals are hard to be affected by the surrounding electrical wires or the like and noise is hard to be superimposed on the detection signals. Accordingly, the rotation of the respective arms 102, 103, 104, 105, 106 may be controlled more accurately. Also, the control signal of the motors 121 may be transmitted faster.

According to the above described second embodiment, the same advantages as those of the above described first embodiment may be offered.

Third Embodiment

Next, a robot according to the third embodiment of the invention will be explained.

Figure 6:
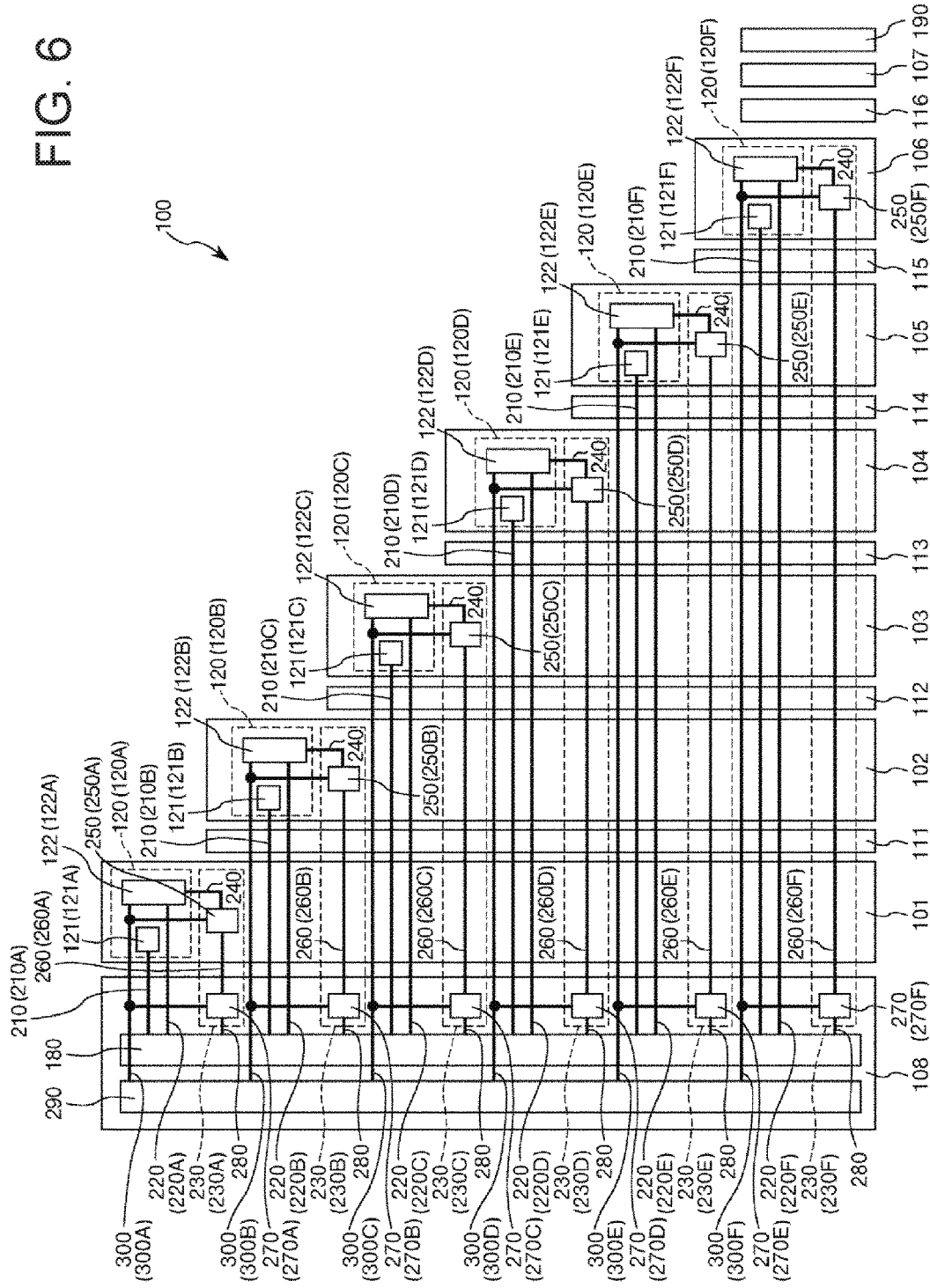
FIG. 6 is a block diagram showing an electrical and optical configuration of a robot according to a third embodiment of the invention.

FIG. 6 is a block diagram showing an electrical and optical configuration of the robot according to the third embodiment of the invention.

The embodiment is the same as the above described first embodiment except that the electrical and optical configuration (wiring structure) is different.

In the following explanation, the embodiment will be explained with a focus on the differences from the above described first embodiment and the explanation of the same items will be omitted. Further, in FIG. 6, the same configurations as those of the above described embodiments have the same signs.

As shown in FIG. 6, in the embodiment, battery wires 300 electrically connecting the battery 290 and the encoders 122 are branched at some midpoints and connected to the optical transceivers 250, 270 so that electric power may be supplied from the battery 290 to the optical transceivers 250, 270 via the battery wires 300. Thereby, as is the case of the above described first embodiment, the number of wires may be reduced and upsizing of the robot 100 may be suppressed.

Note that, hereinafter, the battery wire 300 connecting the battery 290 and the encoder 122A is also referred to as "battery wire 300A", the battery wire 300 connecting the battery 290 and the encoder 122B is also referred to as "battery wire 300B", the battery wire 300 connecting the battery 290 and the encoder 122C is also referred to as "battery wire 300C", the battery wire 300 connecting the battery 290 and the encoder 122D is also referred to as "battery wire 300D", the battery wire 300 connecting the battery 290 and the encoder 122E is also referred to as "battery wire 300E", and the battery wire 300 connecting the battery 290 and the encoder 122F is also referred to as "battery wire 300F".

Specifically, the optical transceiver 270A is electrically connected to the battery wire 300A and supplied with drive power from the battery 290 via the battery wire 300A. The optical transceiver 270B is electrically connected to the battery wire 300B and supplied with drive power from the battery 290 via the battery wire 300B. The optical transceiver 270C is electrically connected to the battery wire 300C and supplied with drive power from the battery 290 via the battery wire 300C. The optical transceiver 270D is electrically connected to the battery wire 300D and supplied with drive power from the battery 290 via the battery wire 300D. The optical transceiver 270E is electrically connected to the battery wire 300E and supplied with drive power from the battery 290 via the battery wire 300E. The optical transceiver 270F is electrically connected to the battery wire 300F and supplied with drive power from the battery 290 via the battery wire 300F.

According to the configuration, the power supply wires used exclusively for the optical transceivers 270 are unnecessary and upsizing of the robot 100 may be suppressed. Particularly, the respective battery wires 300 are branched within the control box 108 in which the respective optical transceivers 270 are placed, and thereby, the wiring lengths from the branched portions to the optical transceivers 270 may be made shorter. Accordingly, the above described advantages are more remarkable.

Further, the optical transceiver 250A is electrically connected to the battery wire 300A and supplied with drive power from the battery 290 via the battery wire 300A. The optical transceiver 250B is electrically connected to the battery wire 300B and supplied with drive power from the battery 290 via the battery wire 300B. The optical transceiver 250C is electrically connected to the battery wire 300C and supplied with drive power from the battery 290 via the battery wire 300C. The optical transceiver 250D is electrically connected to the battery wire 300D and supplied with drive power from the battery 290 via the battery wire 300D. The optical transceiver 250E is electrically connected to the battery wire 300E and supplied with drive power from the battery 290 via the battery wire 300E. The optical transceiver 250F is electrically connected to the battery wire 300F and supplied with drive power from the battery 290 via the battery wire 300F.

According to the configuration, the power supply wires used exclusively for the optical transceivers 250 are unnecessary and upsizing of the robot 100 may be suppressed. Particularly, the respective battery wires 300 are branched within the arms in which the corresponding optical transceivers 250 are placed (for example, the battery wire 300D is branched within the arm 104 and the battery wire 300E is branched within the arm 105), and thereby, the wiring lengths from the branched portions to the optical transceivers 250 may be made shorter. Accordingly, the above described advantages are more remarkable.

According to the above described third embodiment, the same advantages as those of the above described first embodiment may be offered.

Fourth Embodiment

Next, a robot according to the fourth embodiment of the invention will be explained.

Figure 7:
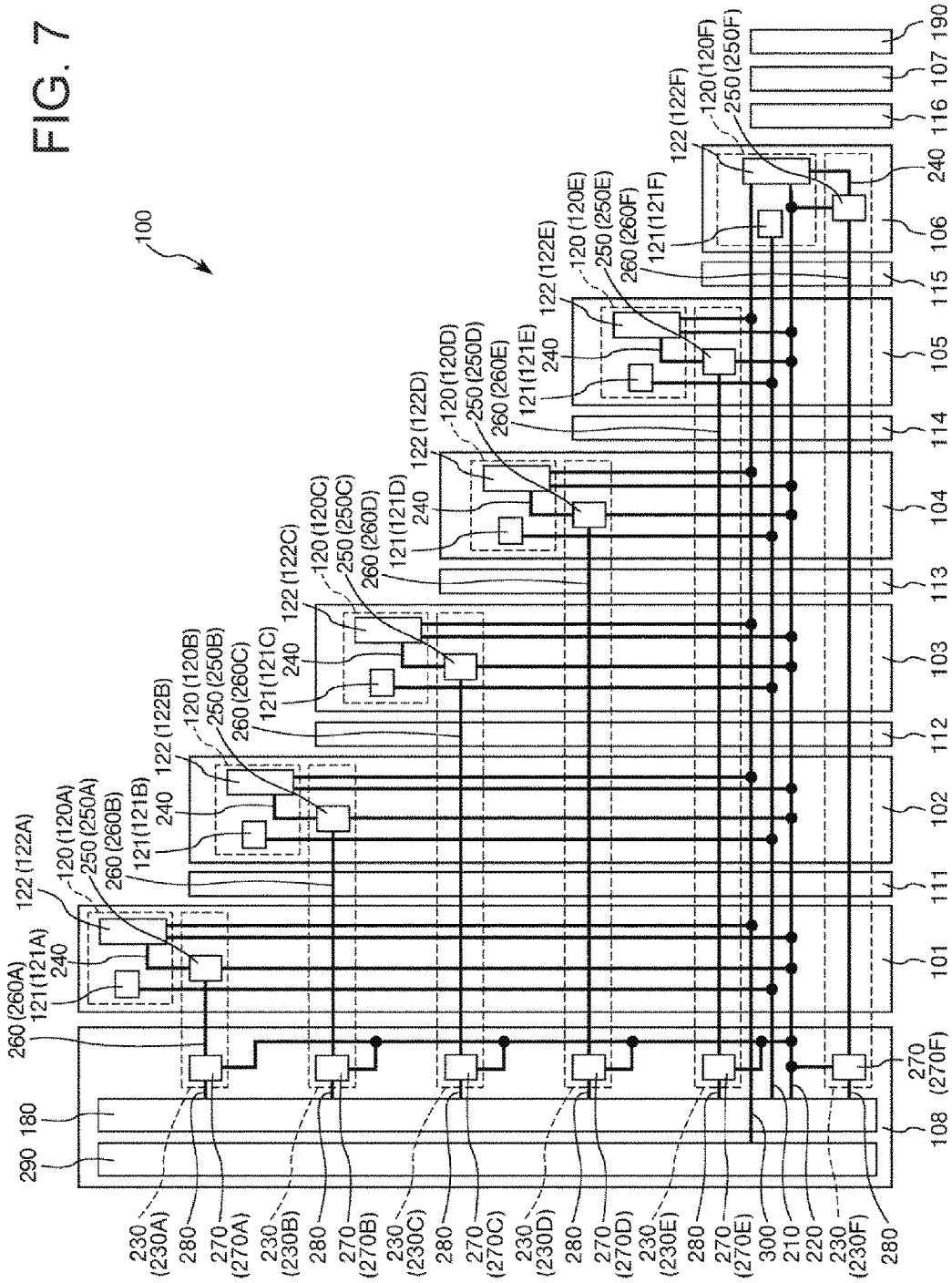
FIG. 7 is a block diagram showing an electrical and optical configuration of a robot according to a fourth embodiment of the invention.

FIG. 7 is a block diagram showing an electrical and optical configuration of the robot according to the fourth embodiment of the invention.

The embodiment is the same as the above described first embodiment except that the electrical and optical configuration (wiring structure) is different.

In the following explanation, the embodiment will be explained with a focus on the differences from the above described first embodiment and the explanation of the same items will be omitted. Further, in FIG. 7, the same configurations as those of the above described embodiments have the same signs.

As shown in FIG. 7, in the embodiment, the single power supply wire for motor 210 is branched at some midpoints and electrically connected to the respective motors 121A, 121B, 121C, 121D, 121E, 121F. Specifically, the power supply wire for motor 210 is branched within the base 101 and connected to the motor 121A, branched within the arm 102 and connected to the motor 121B, branched within the arm 103 and connected to the motor 121C, branched within the arm 104 and connected to the motor 121D, branched within the arm 105 and connected to the motor 121E, and branched within the arm 106 and connected to the motor 121F. Note that the respective motors 121 of the embodiment have motor drivers like those of the above described second embodiment and the driving thereof is controlled by the motor drivers.

Further, the single power supply wire for encoder 220 is branched at some midpoints and electrically connected to the respective encoders 122A, 122B, 122C, 122D, 122E, 122F and the respective optical transceivers 250A, 250B, 250C, 250D, 250E, 250F, 270A, 270B, 270C, 270D, 270E, 270F. Specifically, the power supply wire for encoder 220 is branched within the control box 108 and electrically connected to the respective optical transceivers 270A, 270B, 270C, 270D, 270E, 270F, branched within the base 101 and respectively connected to the encoder 122A and the optical transceiver 250A, branched within the arm 102 and respectively connected to the encoder 122B and the optical transceiver 250B, branched within the arm 103 and respectively connected to the encoder 122C and the optical transceiver 250C, branched within the arm 104 and respectively connected to the encoder 122D and the optical transceiver 250D, branched within the arm 105 and respectively connected to the encoder 122E and the optical transceiver 250E, and branched within the arm 106 and respectively connected to the encoder 122F and the optical transceiver 250F.

Furthermore, the single battery wire 300 is branched at some midpoints and electrically connected to the respective encoders 122A, 122B, 122C, 122D, 122E, 122F. Specifically, the battery wire 300 is branched within the base 101 and connected to the encoder 122A, branched within the arm 102 and connected to the encoder 122B, branched within the arm 103 and connected to the encoder 122C, branched within the arm 104 and connected to the encoder 122D, branched within the arm 105 and connected to the encoder 122E, and branched within the arm 106 and connected to the encoder 122F.

Thereby, for example, compared to the configuration of the above described first embodiment, the numbers of power supply wires for motor 210, power supply wires for encoder 220, and battery wires 300 (the occupancy within the robot 100) may be reduced. Accordingly, the robot 100 may be downsized. Particularly, compared to the configuration of the above described first embodiment, the numbers of the power supply wires for motor 210, power supply wires for encoder 220, and battery wires 300 passing through the respective joint parts 111, 112, 113, 114, 115, 116 are smaller, and thereby, the respective joint parts 111, 112, 113, 114, 115, 116 may be downsized or, if not downsized, spaces for routing other wires may be secured in the respective joint parts 111, 112, 113, 114, 115, 116.

According to the above described fourth embodiment, the same advantages as those of the above described first embodiment may be offered.

Fifth Embodiment

Next, a robot according to the fifth embodiment of the invention will be explained.

Figure 8:
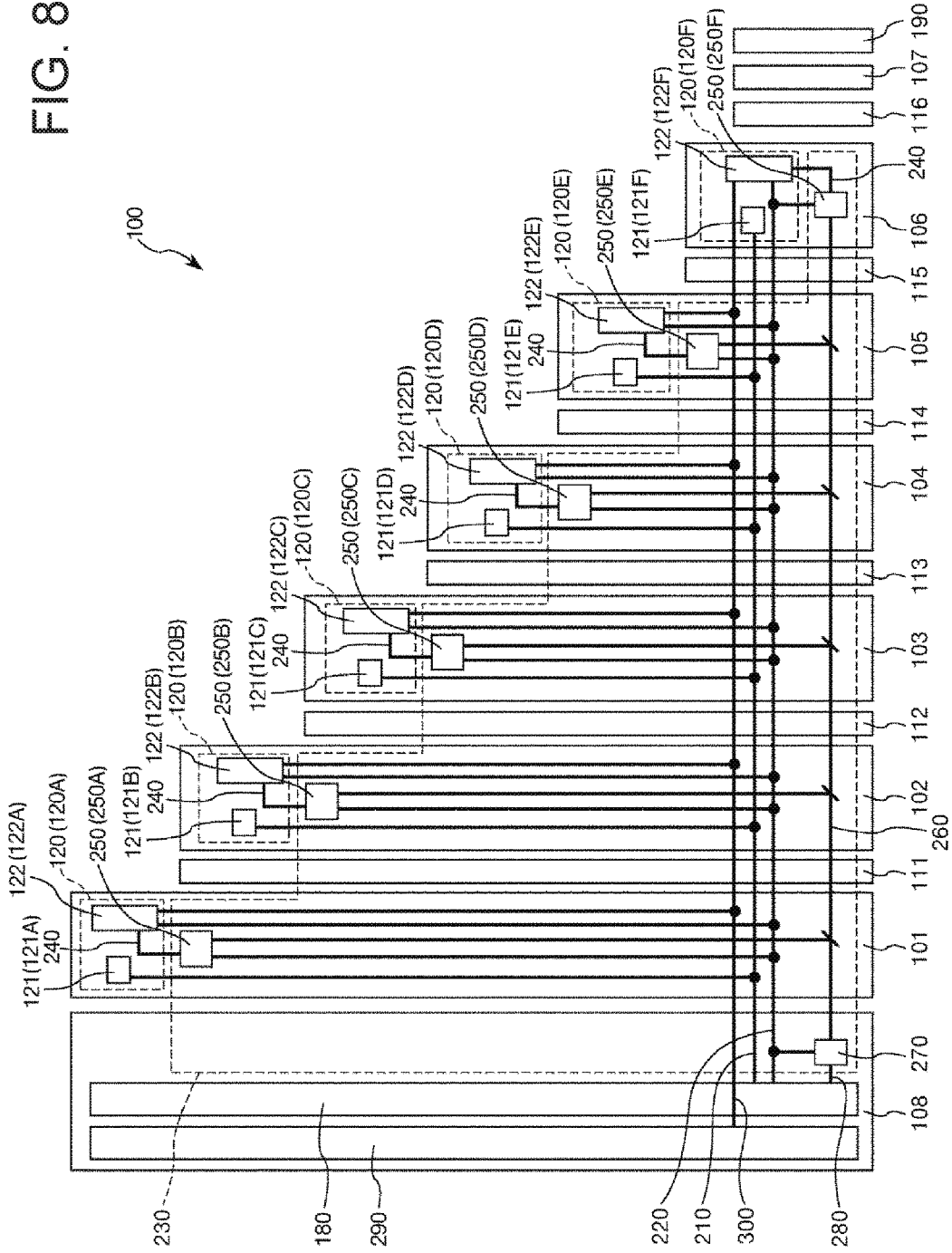
FIG. 8 is a block diagram showing an electrical and optical configuration of a robot according to a fifth embodiment of the invention.

FIG. 8 is a block diagram showing an electrical and optical configuration of the robot according to the fifth embodiment of the invention.

The embodiment is the same as the above described fourth embodiment except that the electrical and optical configuration (wiring structure) is different.

In the following explanation, the embodiment will be explained with a focus on the differences from the above described fourth embodiment and the explanation of the same items will be omitted. Further, in FIG. 8, the same configurations as those of the above described embodiments have the same signs.

As shown in FIG. 8, in the embodiment, the optical wire 260 with one end connected to the optical transceiver 270 is branched at some midpoints and electrically connected to the respective optical transceivers 250A, 250B, 250C, 250D, 250E, 250F. Thereby, for example, compared to the configuration of the above described first embodiment, the number of optical wires 260 (the occupancy within the robot 100) may be reduced. Accordingly, the robot 100 may be downsized. Particularly, compared to the configuration of the above described first embodiment, the number of optical wires 260 passing through the respective joint parts 111, 112, 113, 114, 115, 116 is smaller, and thereby, the respective joint parts 111, 112, 113, 114, 115, 116 may be downsized or, if not downsized, spaces for routing other wires may be secured in the respective joint parts 111, 112, 113, 114, 115, 116. For example, half mirrors may be used for branching of the optical wire 260.

Note that, in the configuration of the embodiment, for example, the detection signals from the respective encoders 122 are time-divisionally transmitted to the robot control unit 180.

According to the above described fifth embodiment, the same advantages as those of the above described first embodiment may be offered.

Sixth Embodiment

Next, a robot according to the sixth embodiment of the invention will be explained.

FIG. 9 is a block diagram showing an electrical and optical configuration of the robot according to the sixth embodiment of the invention.

The embodiment is the same as the above described first embodiment except that the electrical and optical configuration (wiring structure) is different.

In the following explanation, the embodiment will be explained with a focus on the differences from the above described first embodiment and the explanation of the same items will be omitted. Further, in FIG. 9, the same configurations as those of the above described embodiments have the same signs.

As shown in FIG. 9, the robot 100 of the embodiment has an electronic component 400 and a power supply wire for electronic component 410 that electrically connects the robot control unit 180 and the electronic component 400 and supplies drive power from the robot control unit 180 to the electronic component 400. The power supply wire for electronic component 410 is routed from the control box 108 into the hand 190 through within the robot 100. The drive power is supplied from the robot control unit 180 to the electronic component via the power supply wire for electronic component 410, and thereby, the electronic component 400 is driven and actions according to the electronic component 400 may be exerted.

Note that the electronic component 400 is not particularly limited to, but includes various sensors e.g. an acceleration sensor, angular velocity sensor, pressure sensor (atmospheric sensor), force sensor, tactile sensor, temperature sensor, humidity sensor, and camera (imaging device). Further, the placement of the electronic component 400 is not particularly limited. For example, in the embodiment, the electronic component 400 is a camera provided in the hand 190.

In the embodiment, the detection signal transmission path 230 is provided to connect the electronic component 400 and the robot control unit 180. The detection signal transmission path 230 is routed from the control box 108 into the hand 190 through within the robot 100, and the optical transceiver 250 is provided within the hand 190. Then, the detection signals (image signals) from the electronic component 400 are transmitted to the robot control unit 180 via the detection signal transmission path 230.

Further, in the embodiment, the power supply wire for electronic component 410 is branched at some midpoints and connected to the optical transceivers 250, 270 so that electric power may be supplied to the optical transceivers 250, 270 via the power supply wire for electronic component 410. According to the configuration, the power supply wires used exclusively for the optical transceivers 250, 270 are unnecessary and upsizing of the robot 100 may be suppressed. Particularly, in the embodiment, the power supply wire for electronic component 410 is branched within the hand 190 in which the optical transceiver 250 is placed and branched within the control box 108 in which the optical transceiver 270 is placed, and thereby, the wiring lengths from the branched portions to the optical transceivers 250, 270 may be made shorter. Accordingly, the above described advantages are more remarkable.

As above, the robot 100 of the embodiment is explained. The robot 100 has the hand 190 as a first member, the optical wire 260 placed in the hand 190 (inside of the hand 190), the power supply wire for electronic component 410 as a power line placed in the hand 190 (inside of the hand 190), the optical transceiver 250 as a photoelectric conversion unit placed in the hand 190 (inside of the hand 190), and the electronic component 400 placed in the hand 190 (inside of the hand 190). Further, the optical wire 260 is connected to be optically communicable with the optical transceiver 250, the power supply wire for electronic component 410 is connected to be conductive to the electronic component 400 and the optical transceiver 250, and the current flowing in the power supply wire for electronic component 410 is distributed to the electronic component 400 and the optical transceiver 250. According to the configuration, the power supply wire used exclusively for the optical transceiver 250 is unnecessary and upsizing of the robot 100 may be suppressed. Further, the communication speed via optical communications may be made higher and the noise of the detection signals may be made lower, and the robot 100 having the better operating characteristics may be obtained.

According to the above described sixth embodiment, the same advantages as those of the above described first embodiment may be offered. Note that, in the embodiment, the detection signals of the respective encoders 122 are transmitted to the robot control unit 180 via electrical wires (not shown).

When the robot 100 has a plurality of the electronic components 400, the wiring structure shown in FIG. 9 is employed for the respective electronic components 400. Or, in the wiring structures shown in FIGS. 5 to 9, for example, a wiring structure in which one of the motor 121 and the encoder 122 is replaced by the electronic component 400, i.e., a configuration in which at least one of the electrical wire and the optical wire is branched at some midpoints may be employed.

As above, the robot according to the invention is explained with reference to the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

The power supply wires for supplying electric power to the optical transceivers are not particularly limited as long as the wires may supply, preferably constantly, electric power to the optical transceivers during operation of the robot 100. For example, some robots have terminals that can be freely used by users and, in this case, electric power may be supplied from power supply wires routed to the terminals to the optical transceivers.

Further, in the above described embodiments, the configuration of the robot as the six-axis robot is explained, however, the robot is not particularly limited to, but includes e.g. a dual-arm robot and scalar robot.

The entire disclosure of Japanese Patent Application No. 2016-252460, filed Dec. 27, 2016 is expressly incorporated by reference herein.

What is claimed is:

1. A robot comprising:
   a control box including a robot controller, a power source, and a first optical transceiver therein;
   a base body disposed next to the control box;
   a first arm connected to the base body via a first joint, the first arm being movable with respect to the base body and rotatable around a first rotation axis, the first arm including a second optical transceiver and a first encoder therein;
   a first optical wire connected between the first and second transceivers, information being optically transmitted between the first and second optical transceivers via the first optical wire;
   a single power line extending from the control box to the first encoder by passing through inside the base body, inside the first joint, and inside the first arm, power being distributed from the power source to the first encoder;
   a first power node disposed on the single power line inside the first arm; and
   a first power branch line that extends from the first power node so as to connect the second optical transceiver, the power being distributed from the power source to the second optical transceiver via the single power line, the first power node, and the first power branch line.

2. The robot according to claim 1, wherein an electrical signal from the first encoder is output to the second optical transceiver, and the electrical signal is converted into a light signal by the second optical transceiver so as to be propagated to the first optical transceiver by the first optical wire.

3. The robot according to claim 1, further comprising:
   a second arm connected to the first arm via a second joint, the second arm being movable with respect to the first arm and rotatable around a second axis, the second arm including a third optical transceiver and a second encoder therein; and a second optical wire connected between the second and third transceivers, information being optically transmitted between the second and third optical transceivers via the second optical wire,
   wherein the second optical wire and the single power line continuously extend inside the second joint and inside the second arm, and the power is distributed from the power source to the second encoder and the third optical transceiver via the single power line.

* * * * *